United States Patent [19]

Suzaki

[11] Patent Number: 5,649,827
[45] Date of Patent: Jul. 22, 1997

[54] METHOD OF AND SYSTEM FOR DRAWING AN IMAGE OVER STARS IN THE SKY WITH A LASER BEAM

[75] Inventor: Yasuji Suzaki, Yokohama, Japan

[73] Assignee: Hitachi, Ltd., Tokyo, Japan

[21] Appl. No.: 321,617

[22] Filed: Oct. 12, 1994

[30] Foreign Application Priority Data

Oct. 13, 1993 [JP] Japan .................. 5-255936

[51] Int. Cl.⁶ ........................................ G09B 27/00
[52] U.S. Cl. ........................ 434/284; 353/30; 353/28
[58] Field of Search ........................ 434/290, 291, 434/286, 284; 353/330

[56] References Cited

U.S. PATENT DOCUMENTS

| | | | |
|---|---|---|---|
| 1,150,731 | 8/1915 | Barcus | 434/289 |
| 2,477,027 | 7/1949 | Wenberg | 434/289 |
| 2,994,971 | 8/1961 | Meisanheimer | 434/289 |
| 3,250,024 | 5/1966 | Douthitt et al. | 434/286 |
| 3,594,964 | 7/1971 | Clark | 434/286 |
| 3,707,786 | 1/1973 | Clark | 434/286 |
| 4,178,701 | 12/1979 | Sadler | 35/42.5 |
| 4,497,582 | 2/1985 | Lipman et al. | 368/15 |
| 4,639,224 | 1/1987 | Maejima et al. | 434/28 |
| 4,776,666 | 10/1988 | Kuehn et al. | 434/286 |
| 4,955,714 | 9/1990 | Stotler et al. | 434/286 |
| 5,311,226 | 5/1994 | Karasawa | 353/30 |

FOREIGN PATENT DOCUMENTS

| | | |
|---|---|---|
| 462670 | 2/1988 | Japan . |
| 4-134480 | 5/1992 | Japan . |

*Primary Examiner*—Jerome Donnelly
*Attorney, Agent, or Firm*—Antonelli, Terry, Stout & Kraus

[57] ABSTRACT

A system capable of drawing a constellation picture over actual stars in the sky in a superimposed manner therewith. A screen, which allows light from outside the screen to pass, is stretched up above the ground. A laser beam scanner is located on the ground to project and scan a laser beam onto the screen. The laser beam is emitted from the ground with such a power that makes the reflection light from the screen visible from the ground when the laser beam is being scanned onto the screen. Thus, an image of the constellation picture is visible together with their actual constituent stars in the sky, in a superimposed manner. A novel tool is provided which is effective for education, study and observation of constellations and heavenly bodies.

18 Claims, 2 Drawing Sheets

METHOD OF AND SYSTEM FOR DRAWING AN IMAGE OVER STARS IN THE SKY WITH A LASER BEAM

BACKGROUND OF THE INVENTION

1. Field of the Invention

The present invention generally relates to the application of a laser beam to the remote drawing of an image, such as a picture, characters and various patterns, using its properties of directivity, high intensity and monochromaticity, by scanning the laser beam by means of an optical scanner such as the galvanometer scanner, and particularly to a method of and system for drawing an image over a background or more specifically for drawing pictures of constellations having a background of stars in the sky.

2. Description of the Related Art

Recently, in the fields of education, culture, lifestyle etc., activities reflecting harmony with nature have become necessary so that a better understanding of the cosmos and heavenly bodies is promoted by directly communing with nature. In this connection, enrichment of facilities for such a purpose has come to be needed in various fields. In this context, constellation classes or meetings for observing stars in the sky have been planned and held at a lot of places.

Incidentally, when explaining a constellation and its constituent stars, which is often needed in the classes or meetings, it is quite difficult to have the participants imagine the picture of the constellation, to which the explanation is directed, with respect to the actual stars which they are watching.

As a prior art approach to this, there is proposed a constellation image display apparatus disclosed in Japanese patent application laid-open (KOKAI) No. 4-134480, which enables an easy comparison of an actual constellation with its associated image by using a combiner. The combiner includes a half-mirror not only to pass the light from the starlit sky but also to reflect a constellation image created on a cathode ray tube (CRT) display such that they can be observed in a superimposed fashion with each other.

This prior art system is, however, for personal use, and is not appropriate for simultaneous observation by a lot of people. At present, there is no effective means usable for an explanation of stars and constellations to a lot of people with reference to the actual stars in the sky.

SUMMARY OF THE INVENTION

An object of the invention is to provide a method of and system for learning about or watching constellations and their constituent stars with reference to the actual stars in the sky during scientific education in school, or classes for the general public to observe heavenly bodies.

According to the present invention, there is provided a method of drawing an image over stars in the sky with a laser beam, comprising a step of projecting and scanning a laser beam emitted from a scanner device which is positioned on the ground, toward a screen which is placed up above the ground having the starlit sky behind the screen, the screen allowing light from outside the same to pass, the laser beam being of such a power that it enables light created by reflection of the laser beam on the screen to be visible from the ground, whereby an image including a constellation picture drawn by the scanning of the laser beam is seen together with heavenly bodies in the background.

A principle and specific construction of the present invention are as follows. A screen of a net, which is loosely woven or knitted with a thin thread or fiber, is stretched up above the ground at a distance where the screen is invisible from the ground with the naked eye. A pattern such as a constellation is drawn on the net screen by projecting and scanning a laser light toward the screen from the ground. Thus, most of the stars in the sky behind the screen are visible through the screen from the ground while the framework of the constellation drawn by the laser light is simultaneously seen in a superimposed manner with the stars.

The resolution which is distinguishable by the human eye depends upon the magnitude of an optic cell of the retina, and it is known that the value of the resolution is approximately 20 seconds in visual angle. When a thread having a diameter of 0.1 mm is at a distance of 10 m away from an observer, the visual angle is approximately 2 seconds, which is lower by one digit order than the human eye's resolution. An actual resolution of the human eye varies widely depending upon the contrast of an object to be observed, and hence, it can be said that the net screen is not visible at all in the darkness having a background of the night sky. This could be confirmed experimentally. If a net screen is made of a fiber having a diameter of 0.1 mm at 1 cm intervals, then the area of the fibers of the net which masks the background will have a rate of 2% with respect to the corresponding area of the background, which is readily calculated as follows:

$$2 \times 0.1 \text{ mm} \times 10 \text{ mm}/(10 \text{ mm} \times 10 \text{ mm}) = 2 \text{ mm}^2/100 \text{ mm}^2 = 0.02$$

If the interval of the fibers is set to 10 cm, then the rate will be 0.02%. For these reasons, such a net screen will provide almost no loss in the amount of light coming from behind the screen, when seeing the background therethrough.

It will next be examined, when the net screen is stretched at a height of 10 m from the ground and a laser beam is projected and scanned onto the screen, whether or not the reflected light of the laser beam is visible on the ground. It is easy to focus a laser beam having a diameter of 2 w at a position 10 m away from a laser source, where "w" indicates the size of a spot of the laser beam. When drawing, with this laser beam, a picture of a constellation having a size of several meters on the net screen placed 10 m ahead, a time t over which the laser beam crosses one fiber is determined by the following formula (1), with an assumption that a scanning velocity v of the laser beam of at least 500 m/s is required to be seen by the human eye as a continuous wire frame image, and that the beam goes across a fiber of a diameter d=0.1 mm at right angles therewith.

Since d is negligibly small compared with 2 w, the value t is given by:

$$t = 2w/v = 1 \text{ mm}/(5 \times 10^5) \text{mm/s} = 2 \text{ } \mu s \quad (1)$$

The energy $\epsilon$ (J) of the light is given by the following formula (2):

$$\epsilon = P \cdot t \cdot (a/A) \quad (2)$$

where "P" indicates a power (watt) of the laser, and "A" and "a" indicate an area of the cross section of the laser beam and an area of the reflection cross section of the fiber, respectively. If the laser power is 1 watt and a/A is approximately equal to 0.1, then $$\epsilon = 1 \text{ (watt)} \times 2 \times 10^{-6} \text{ (sec)} \times 0.1 = 2 \times 10^{-7} \text{ (J)}$$

The number Ns of photons which enter into the human eye a distance R away from the reflecting fiber is given by the following formula (3) with an assumption that the fiber is a diffuse reflector.

$$Ns = \frac{\epsilon \cdot \rho \cdot b2 \cdot \lambda}{4R^2 \cdot h \cdot c} \text{ (photons)} \quad (3)$$

where "$\lambda$" indicates a wavelength of the laser light, "$\rho$" indicates an integral reflectivity, "b" indicates a diameter of the human eye, "h" indicates the Planck's constant ($6.63 \times 10^{-34}$ (J·s)), and "c" indicates the velocity of light ($3 \times 10^{10}$ cm·s$^{-1}$).

For example, when the second harmonic of Nd-YAG laser light is used with $\lambda$:0.53 $\mu$m=$5.3 \times 10^{-5}$ cm, $\rho$:0.3, b:5 mm, R: 10 m=$10^4$ mm, the number Ns is given by the following formula (4):

$$Ns = \frac{2 \times 10^{-7} \times 0.3 \times 5^2 \times 5.3 \times 10^{-5}}{(4 \times (10^4)^2 \times 6.63 \times 10^{-34} \times 3 \times 10^{10})} \approx 10^4 \text{ (photons)} \quad (4)$$

It is known that the human eye in darkness is sensitive with even a few tens of photons with respect to light of a wavelength in the 0.5 $\mu$m band. As a result, the reflection light from the fiber under the foregoing conditions will be sufficient to be sensed.

The above discussion has been directed to a reflection light created by direct reflection on the surface of the fiber of the net. Alternatively, the fiber may be coated or dyed with a light emitting material which emits luminescence, such as fluorescence or phosphorescence. In this case, it is expected that light of a wavelength unequal to that of the projected laser light can be emitted, with an effect of afterglow. In general, the fluorescent or phosphorescent light has a long wavelength relative to an excited light, with a duration of $10^{-9}$ sec. to several minutes of the afterglow. As a result, the following two advantages will be provided with this arrangement. One is that a visible light can be emitted by using, as an excited light, an ultraviolet laser light which is an invisible light. If a high-power visible laser light is projected into the night air, strong diffused light would be visually recognized, which could be noise with respect to the images drawn on the screen, also adversely affecting the visibility of the heavenly bodies present in the background. This could be a major obstacle in embodying the present invention. This problem will, however, be overcome by using as a projecting laser light an invisible light, such as an ultraviolet ray, and using a net screen made of fibers coated or dyed with a fluorescent or phosphorescent material, thereby establishing a system such that only the picture drawn on the net screen is visible and the light rays diffused in the air are invisible. Another advantage is that the difficulty in high-speed control of the scanner for drawing complicated pictures of constellations is reduced owing to the after-glow effect of the fluorescence or phosphorescence. Although it has come to be possible at present to draw rather complicated pictures owing to the progress of a scanner such as the galvanometer scanner, more complicated and fine pictures could be drawn taking advantage of this feature.

According to the present invention, it is possible to draw constellation pictures over the real stars in the sky, thereby realizing an educational or communicational tool relating to nature, which is suitable for promoting a better understanding of and intimacy with nature through actually feeling the same. This tool can be utilized in educational or entertainment facilities.

DETAILED DESCRIPTION OF THE PREFERRED EMBODIMENT

Now, a preferred embodiment of the present invention will be described hereinafter with reference to the attached drawings.

An embodiment of the invention is to realize a system constructed as follows. A hemispherical dome, which is rotatable about a vertical axis, is provided with a large-scaled window over which a net screen is stretched. A projecting scanner of a laser beam is located at a position near the center of the dome such that a laser beam is projected toward the screen and scanned so as to draw a constellation picture on the screen in a superimposed manner with stars in the background.

Figure 1A:
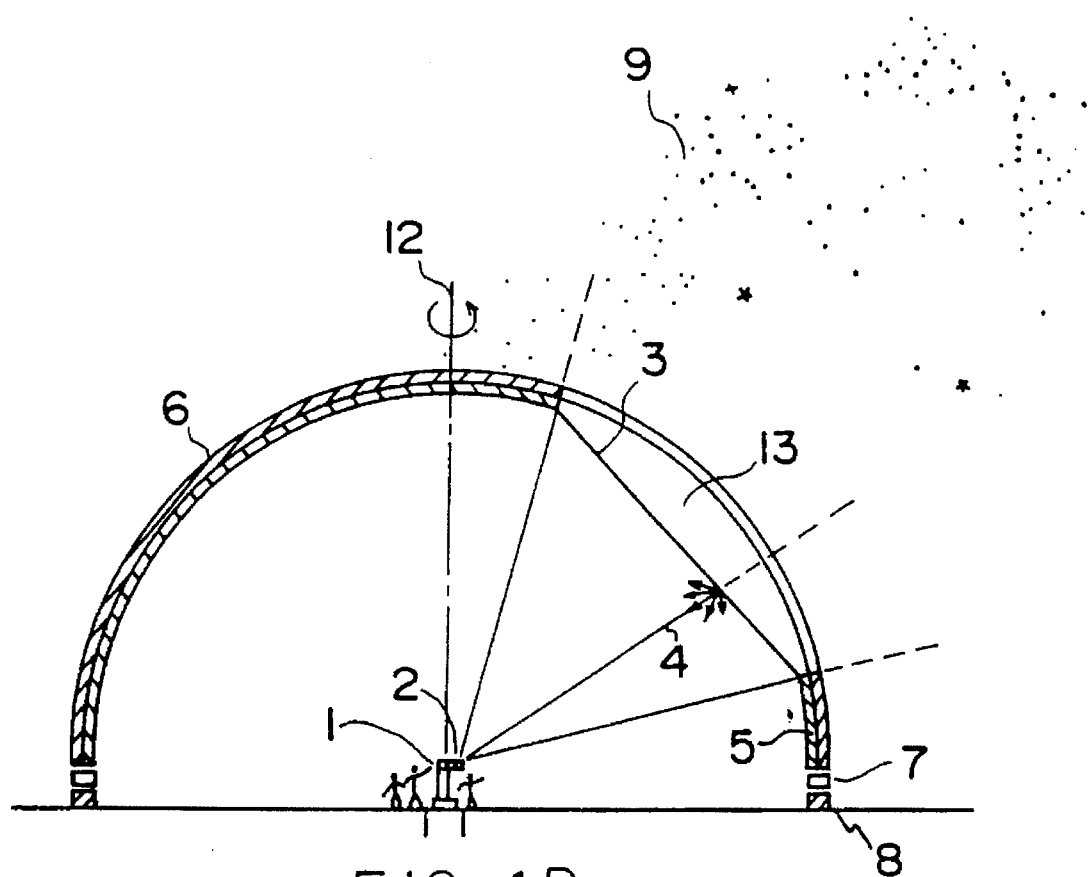
FIG. 1A shows a section view of a system according to the present invention.
Figure 1B:
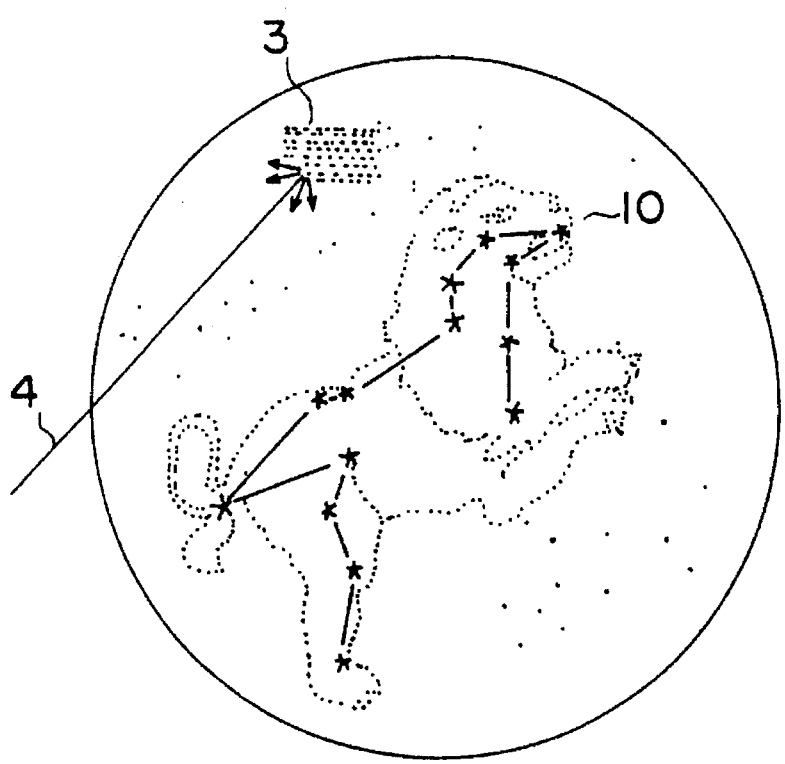
FIG. 1B shows a front view of a screen which is used in the system shown in FIG. 1A.

Referring to FIGS. 1A and 1B, there is shown a specific example of a system according to the present invention. FIG. 1A shows a side section view of the system. Indicated by reference numeral 1 is an elevation/azimuth optical mount which includes a laser light source and an optical system, and is capable of emitting a laser beam in an arbitrary direction. Indicated by reference numeral 2 is a laser scanner which is capable of scanning a laser beam to draw an arbitrary pattern. Reference numerals 3 and 4 indicate a net screen and an emitted laser beam, respectively. Reference numeral 5 indicates a rotary dome having a large-scaled window 13 over which the net screen 3 is stretched. Reference numeral 6 indicates a cover dome which is coaxially rotatable around the dome 5. Reference numeral 7 indicates rollers which bear and enable the domes 5 and 6 to rotate about the vertical axis. Also, reference numerals 8 indicates a rail for supporting the rollers 7, and reference numeral 9 indicates stars in the background behind the screen 3, respectively. The domes 5 and 6 can be rotatively driven by a rotary drive apparatus (FIG. 2), independently of each other. The cover dome 6 is provided to protect the screen 3 during a time of nonuse, and has a window which corresponds to the window 13 of the dome 5 in this embodiment. During operation, the cover dome 6 is rotated so that its window is overlapped with the window 13 of the dome 5, whereas during nonuse, the rotation is carried out such that the window 13 is closed with the cover dome 6. It should be noted, however, that the present invention is not limited to this particular arrangement. For example, the cover dome 6 may be eliminated, as long as some means to open and close the window 13 is provided.

Referring to FIG. 1B, there is shown a front view of the net screen 3 shown in FIG. 1A when viewed from inside the dome 5. Indicated by reference numeral 10 is an image of a picture of a constellation (Leo in this case) which was drawn on the net screen having stars in the background.

Referring back to FIG. 1A, an emitted laser beam 4 passes through the elevation/azimuth mount 1 and then passes the laser scanner 2 to be scanned to draw a constellation picture on the net screen 3. The points, at which the laser beam 4 crosses fibers of the net screen 3, are visually recognized from the ground as bright spots of the image 10. The dome 5 is rotatable 360 degrees about the vertical axis and is moved so as to direct the window 13 toward the stars in the night sky to be explained that night. At this position of the dome 5, a constellation picture is drawn on the net screen by the scanner 2, with assistance of the elevation/azimuth mount 1. In order to avoid impairing the natural feeling, it is desirable to have a view angle of the window 13 as wide as possible. In the case shown in FIG. 1A, the window 13 has a diameter approximately equal to the radius of the dome 5, thereby attaining a view angle of about 60 degrees. As a matter of the fact, if the radius of the dome 5 is of 10 m, then the diameter of the window 13 also becomes 10 m, which is sufficiently practical in making the net screen of this size.

Figure 2:
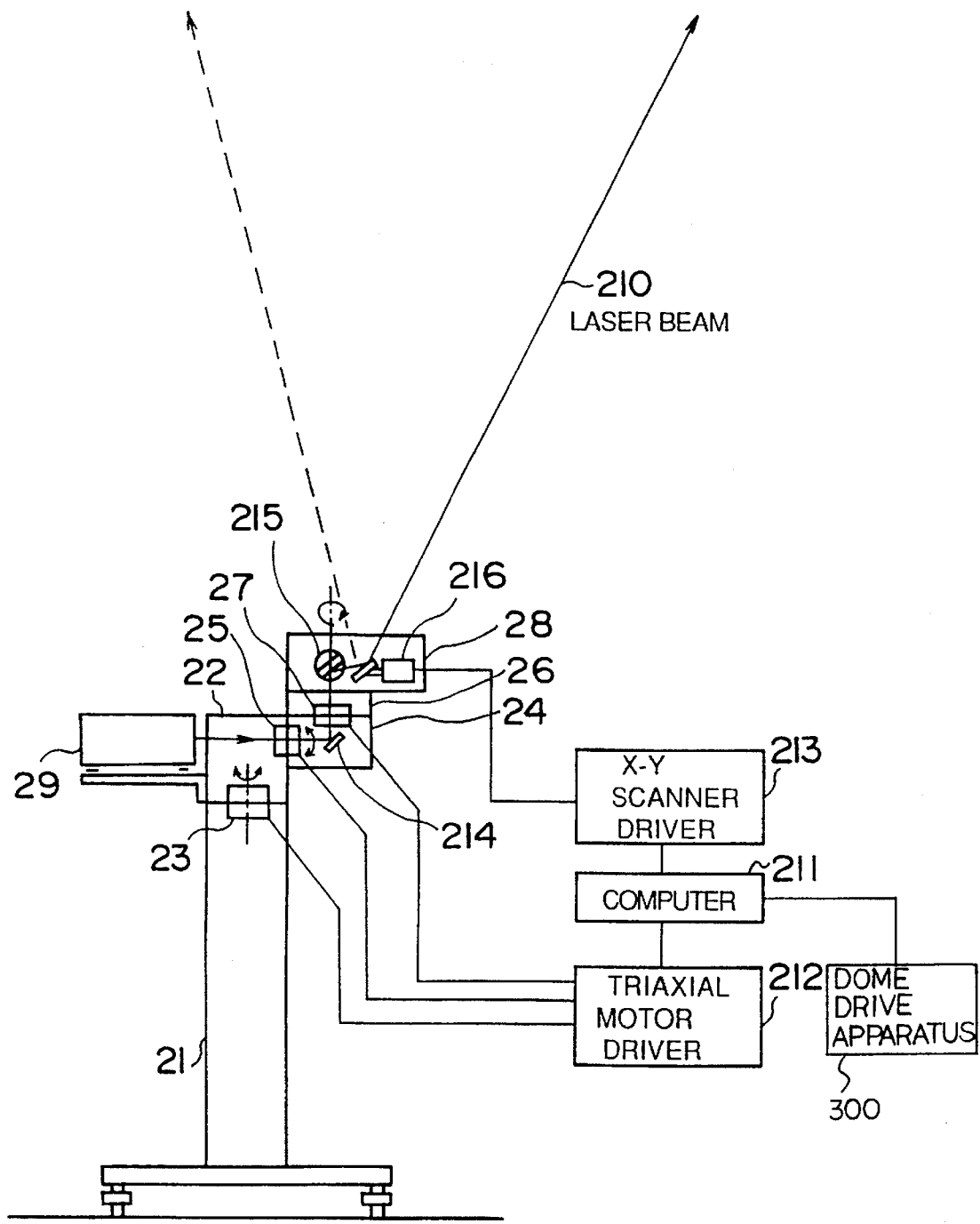
FIG. 2 shows a diagram for explaining the construction of an optical axis mount for mounting an optical scanner, which draws constellation pictures, used in the system shown in FIG. 1A.

Referring next to FIG. 2, an explanation will be made with respect to the optical axis mount 1 which supports thereon the optical scanner 2 for drawing the constellation pictures.

In FIG. 2, a base mount 21 bears thereon a laser source and an optical system. An azimuth axis mount 22 is supported on the base mount 21 and is rotatable about the vertical axis (azimuth axis) for determining an azimuth of the direction of the scanner 2. A drive motor 23 serves to rotatively drive the azimuth axis mount 22. An elevation axis mount 24 is located at a side of the azimuth axis mount 22, rotatably about a horizontal axis (elevation axis), for determining an elevation of the direction of the scanner 2. A drive motor 25 serves to rotatively drive the elevation axis mount 24. Indicated at 29 is a laser source or oscillator. The elevation axis mount 24 includes a mirror 214 for reflecting a laser beam coming from the laser oscillator 29 along the shaft of the elevation axis drive motor 25 in a direction perpendicular thereto. A diurnal motion tracking axis mount 26 is located at a side of the elevation axis mount 24, from which the reflected laser beam is emitted, and is rotatable about the path of the reflected laser beam. A diurnal motion tracking motor 27 serves to rotatively drive the diurnal motion tracking axis mount 26. A scanner 28 is an X-Y scanner which is fixed on the mount 26. The X-Y scanner 28 includes an X-scanning mirror 215 for re-reflecting the reflected laser beam to perform the X-scanning, and a Y-scanning mirror 216 for re-reflecting the re-reflected laser beam to perform the Y-scanning. Reference numeral 210 indicates an output laser beam which corresponds to the laser beam 4 shown in FIG. 1A. A computer 211 is provided to offer control of the entire system. Reference numeral 212 indicates a triaxial motor driver to drive the motors 23, 25 and 27. An X-Y scanner driver 213 is provided to drive the X-Y scanner 28. A dome drive apparatus 300 includes motors for rotatively driving the domes 5 and 6 about the vertical axis independently of each other.

Thus, the laser oscillator 29 and the associated optical system including various elements are all mounted on the azimuth axis mount 22. The laser beam 210 emitted from the laser oscillator 29 passes a hollow shaft of the elevation axis drive motor 25 and is reflected at the mirror 214 to pass through a hollow shaft of the diurnal motion tracking motor 27, and then by way of the X- and Y-scanning mirrors 215, 216, it finally reaches the screen 3.

The azimuth axis drive motor 23, the elevation axis drive motor 25 and the diurnal motion tracking motor 27 are driven by the motor driver 212 under the control of the computer 211. The elevation axis drive motor 25 and the azimuth axis drive motor 23 in combination enable the laser beam to be directed to stars in any direction in the whole sky. As explained above, the domes 5 and 6 are rotatively controlled by the computer 211 to direct the window 13 in any desired direction.

In addition, in order to draw a constellation picture over actual stars in the sky at any given time, it is required to be able to track the positional shift of a target constellation due to the diurnal motion. The positional shift varies at a rate of one cycle per 24 hours. The diurnal motion tracking axis mount 26 and the diurnal motion tracking motor 27 serve in combination to track the positional shift due to the diurnal motion. In this connection, a reference position or the center of the target constellation can, of course, be tracked by the elevation axis drive motor 25 and the azimuth axis drive motor 23.

The drawing of a constellation picture is carried out by the scanning of a laser beam, which is controlled by the X-Y scanner driver 213 which drives the X-Y scanner 28 including the X- and Y-scanning mirrors 215, 216, under the control of the computer 211. A well known product called a galvanometer scanner can be used as the X-Y scanner 28. It may be considered that in principle, the usage of the computer controlled X-Y scanner eliminates the need of the complicated optical system mentioned above. The above-described arrangement of the invention is, however, practical when considering the aiming, tracking and drawing of any one of the constellations in the whole sky at any given time, and also considering a limited range of the scanning angle of the X-Y scanner. This arrangement of the present invention enables the drawing of constellation pictures over the actual stars in the sky, with readily creatable computer software.

In the embodiment described above, a net is used as the screen. Alternatively, a plate or a spherical shell of transparent material, such as plastic, glass or the like, can be used as the screen which generates diffused reflection light rays in response to the laser light. Further, artificially created fog or mist in the form of a thin plate may also be used as the screen.

According to the present invention, as mentioned above, it is possible to draw a constellation picture over actual stars present in the background in a superimposed manner therewith, thereby providing a novel tool suitable for education, study, observation, etc. of constellations.

What is claimed is:

1. A method for drawing and superimposing an image over stars in the sky with a laser beam, comprising a step of projecting and scanning a laser beam emitted from a scanner device toward a substantially transparent screen which is placed between said observation area and the starlit sky, said screen allowing light from the starlit sky to pass therethrough to be viewable from said observation area, the laser beam being of such a power that enables light created by reflection of the laser beam on the screen to be visible from said observation area, whereby an incident image drawn by the scanning of the laser beam on the screen is seen from said observation area as being superimposed together with heavenly bodies from the starlit sky.

2. A method according to claim 1, wherein said screen includes fibers knitted into a net, said fibers incorporating a light emitting material which emits light of a wavelength unequal to that of the laser beam in response thereto.

3. A method according to claim 2, wherein a light source is used to emit an invisible light as the laser beam so that only a portion of the net, which is irradiated by the invisible light, emits a visible light.

4. A system for drawing and superimposing an image over stars in the sky with a laser beam, comprising:

a hemispherical dome for accommodating therein observers of heavenly bodies, said dome having an observation window;

a substantially transparent screen, said screen being stretched over the observation window of said hemispherical dome, allowing light from said heavenly bodies outside of said hemispherical dome to pass therethrough;

a light source for emitting a laser beam;

projecting and scanning means for projecting and scanning the laser beam emitted from the light source onto the screen thereby drawing an image thereon, wherein an incident image drawn by the scanning of the laser beam on the screen is seen by said observers as being superimposed together with said heavenly bodies.

5. A system according to claim 4, wherein said projecting and scanning means includes an X-Y scanner for two-dimensionally scanning the laser beam on the screen.

6. A system according to claim 4, further comprising a base mount, and wherein said projecting and scanning means includes:

an azimuth axis mount supported on said base mount rotatably about a vertical axis;

an elevation axis mount supported on said azimuth axis mount rotatably about a horizontal axis; and an X-Y scanner supported on said elevation axis mount for scanning the laser beam on the screen.

7. A system according to claim 6, wherein said projecting and scanning means further includes tracking means for tracking a rotational shift in position of the heavenly bodies which occurs due to diurnal motion.

8. A system according to claim 7, wherein said tracking means includes a tracking mount which is located between said X-Y scanner and said elevation mount, said tracking mount supporting thereon said X-Y scanner, rotatably about an axis perpendicular to said horizontal axis at a rate of one cycle per 24 hours.

9. A system according to claim 4, further comprising means for rotatively driving said hemispherical dome about a vertical axis.

10. A system according to claim 4, wherein said screen is a net.

11. A system according to claim 10, wherein said net has a light emitting material which emits light in response to said laser beam being incident thereon.

12. A system according to claim 11, wherein said light source emits an invisible light laser beam.

13. A method according to claim 1, wherein said screen includes of fibers knitted into a net, said fibers being reflective of said laser beam light incident thereon.

14. A method according to claim 4, wherein said screen includes fibers knitted into a net, said fibers being reflective of said laser beam light incident thereon.

15. A method according to claim 1, wherein said scanner device projects and scans said laser beam toward the screen from said observation area.

16. A method according to claim 4, wherein said scanner device projects and scans said laser beam toward the screen from inside of said hemispherical dome.

17. A method for drawing and superimposing images with at least one laser beam on a starred sky, comprising:

setting a substantially transparent screen above an observation area, projecting images using laser beam scanning means, wherein said screen is constructed in such a way that most light from said starred sky passes through said screen without substantial reflection thereof so that the starred sky may be seen through said screen from said observation area, wherein a laser beam from said laser beam scanning means has enough intensity so that said laser beam incident upon and reflected by said screen is visible from said observation area, and wherein the projected images have shapes corresponding to stars or constellations, and are projected at places on said screen so as to be superimposed together with corresponding stars or constellations which are visible through said screen from said observation area.

18. A method according to claim 17, wherein said scanner device projects and scans said laser beam toward the screen from said observation area.

* * * * *